United States Patent [19]

Levy

[11] Patent Number: 5,123,665
[45] Date of Patent: Jun. 23, 1992

[54] EXPANDABLE AND COMPRESSIBLE CARRIER

[76] Inventor: Isy R. Levy, Avenida Salaverry 2650, San Isidro, Lima, Peru

[21] Appl. No.: 777,209

[22] Filed: Oct. 16, 1991

[51] Int. Cl.⁵ .............................................. B62B 3/02
[52] U.S. Cl. ...................... 280/35; 280/659; 211/201
[58] Field of Search ................ 280/638, 35, 651, 639, 280/654, 37, 659, 645, 473.9, 42; 108/120, 118; 211/201, 202; 296/173, 76

[56] References Cited

U.S. PATENT DOCUMENTS

| | | | |
|---|---|---|---|
| 223,017 | 12/1879 | Tucker et al. | 280/35 |
| 1,390,123 | 9/1921 | Gilkey et al. | 280/35 |
| 2,020,766 | 11/1935 | Brown | 280/639 |
| 2,556,947 | 6/1951 | Smith | 280/35 |
| 2,645,538 | 7/1953 | Segal | 280/79.3 |
| 2,885,090 | 5/1959 | Forman et al. | 280/35 |
| 3,937,485 | 2/1976 | Shourek et al. | 280/35 |
| 3,955,511 | 5/1976 | Bak | 108/59 |
| 4,249,749 | 2/1981 | Collier | 280/35 |
| 4,350,222 | 9/1982 | Lutteke | 280/638 |
| 4,845,804 | 7/1989 | Garrett | 280/37 |
| 5,016,893 | 5/1991 | Hart | 280/35 |
| 5,033,758 | 7/1991 | Levy | 280/35 |

*Primary Examiner*—David M. Mitchell
*Attorney, Agent, or Firm*—Richard C. Litman

[57] ABSTRACT

An improved expandable and compressible carrier which is expanded and compressed in all three dimensions. The carrier structure includes multiple but identical components for economy in cost of manufacture. The carrier may be expanded and compressed manually or by one or more motors. Carrier components are interconnected such that by movement of components in one dimension, the carrier expands or contacts in the other two dimensions.

23 Claims, 4 Drawing Sheets

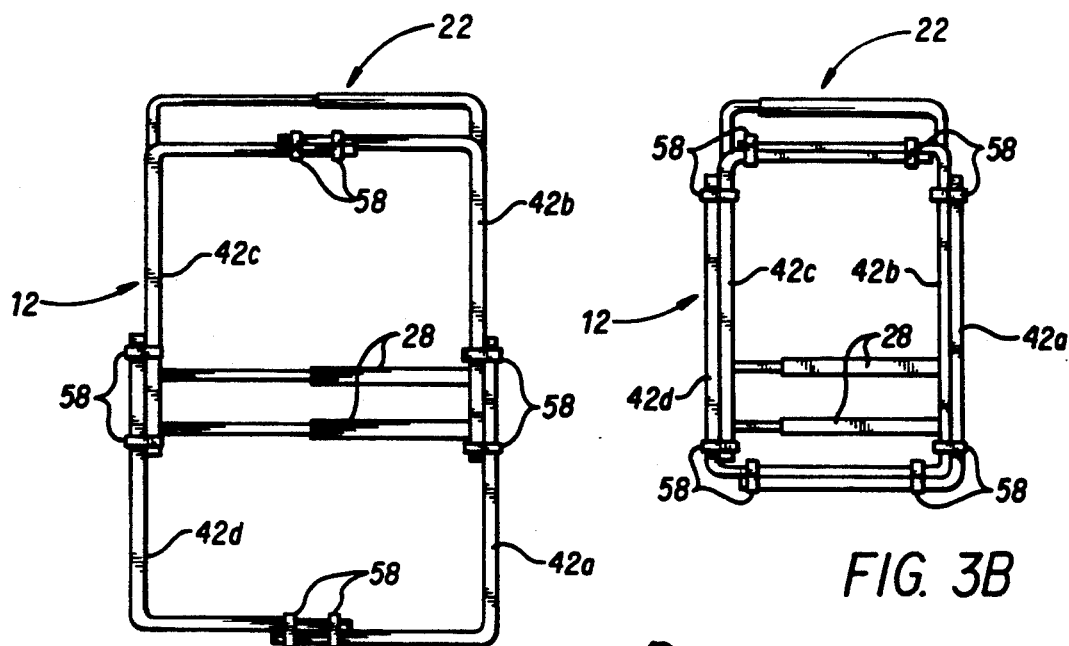
FIG. 3A
FIG. 3B
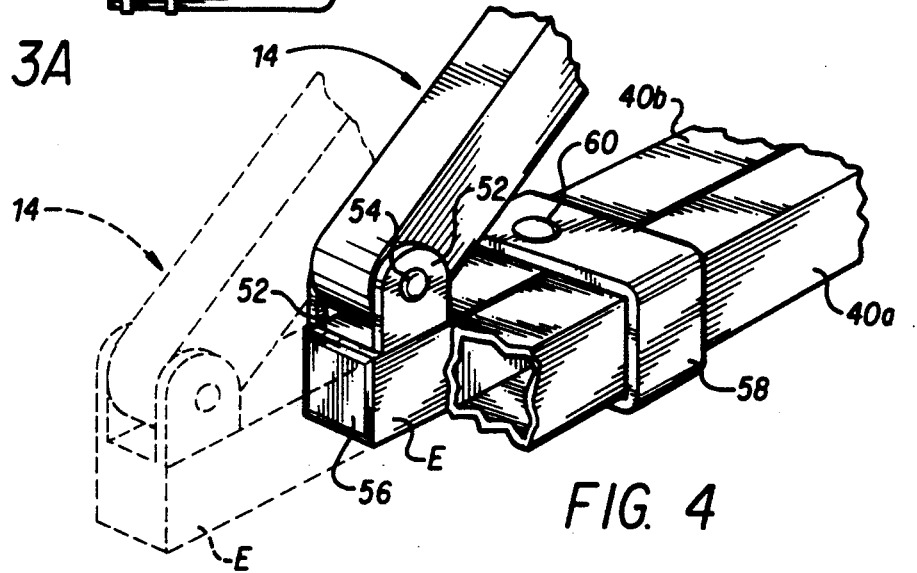
FIG. 4
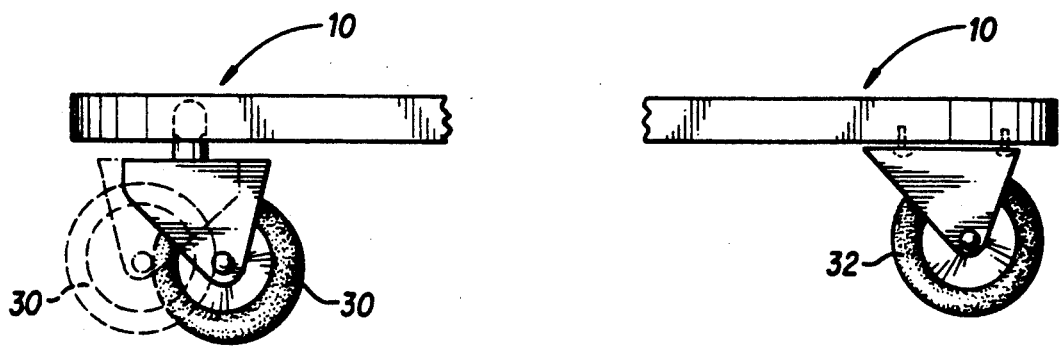
FIG. 5
FIG. 6

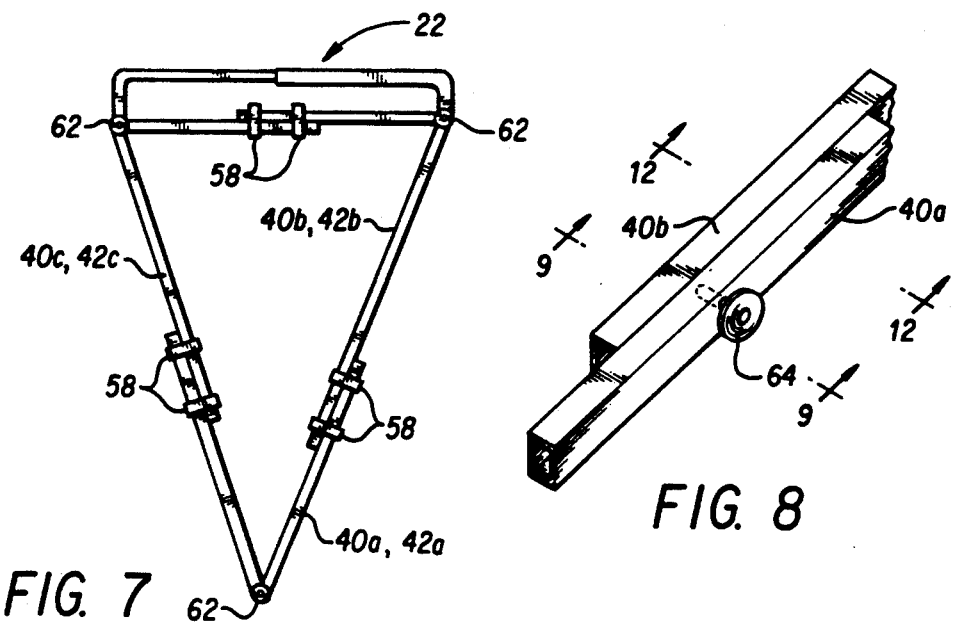
FIG. 7
FIG. 8
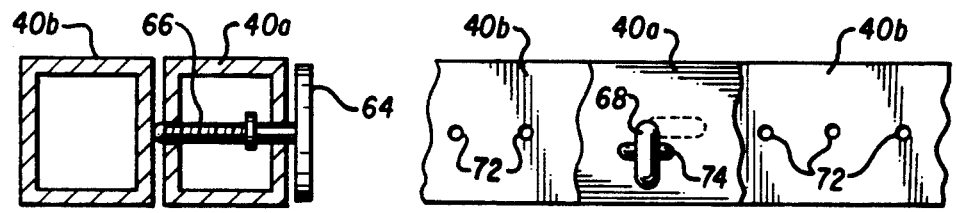
FIG. 9
FIG. 11
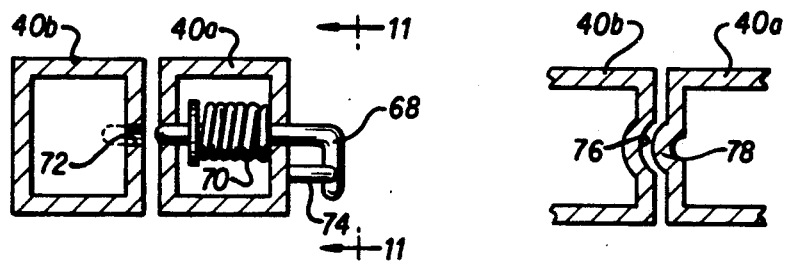
FIG. 10
FIG. 12

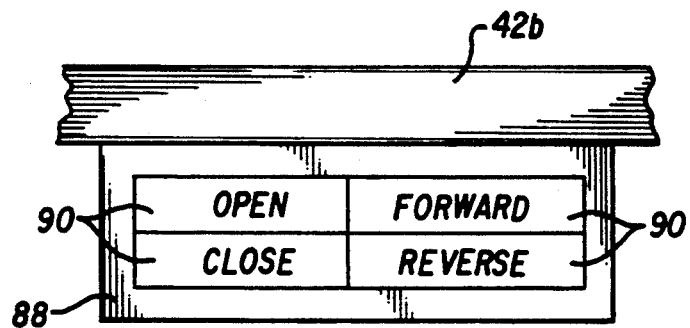
FIG. 13
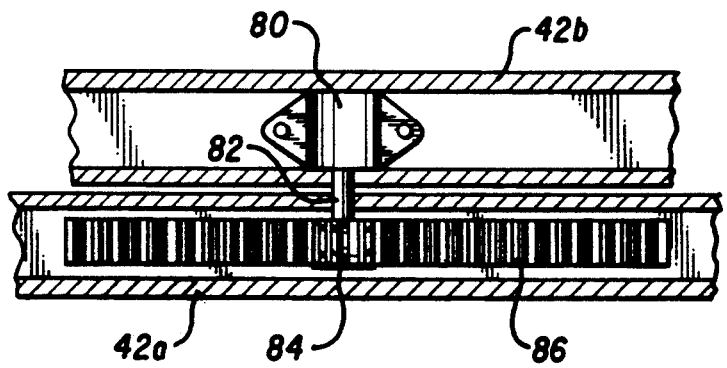
FIG. 14
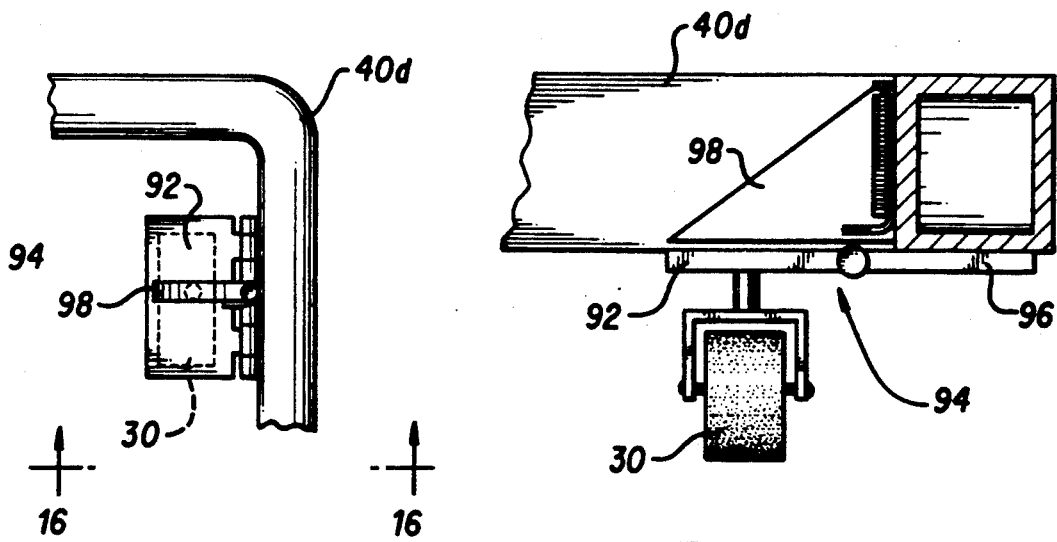
FIG. 15
FIG. 16

EXPANDABLE AND COMPRESSIBLE CARRIER

FIELD OF THE INVENTION

The present invention relates to carriers or carts which are three dimensionally expandable and compressible.

DESCRIPTION OF THE PRIOR ART

Expandable and compressible carriers and carts of the two or four wheel variety are well known. More particularly, such carts are compressed into an almost flat configuration for storage and expanded for use into a four sided basket or cart with either two or four wheels for ease of mobility for the user. Perhaps the most recognizable cart of the type under discussion is the common two wheeled shopping basket with folding sides and an upwardly folding bottom.

A significant advance in the art of such carriers is set forth in my own prior U.S. Pat. No. 5,033,758 issued July 23, 1991. A wheeled carrier is taught in this patent which is fully expandable and compressible in three dimensions and may be manually or motor operated. Additionally, this carrier may have a quadrilateral configuration other than rectangular.

Other somewhat relevant prior art disclosures of carriers or carts of the type under discussion include the following. U.S. Pat. No. 1,390,123 issued Sep. 6, 1921 to Leon L. Gilkey et al shows a wheeled trunk carrier with a base expandable in length and width and made up of straps overlaid on one another which are retained together by sleeves with set screws threaded through the sleeves. A single, collapsible, adjustable heighth and width retaining wall is attached along one side of the carrier base. A television stand adjustable in length only and provided with telescopically interfitted, adjustable length tubular supports is taught in U.S. Pat. No. 3,995,511 issued May 11, 1976 to Walter L. Bak. Heighth adjustment only for a wheeled cart in the form of a postal stand is disclosed in U.S. Pat. No. 2,645,538 issued Jul. 14, 1953 to Samuel Segal. A scissors linkage assembly operative in lazy tong fashion coupled with telescoping leg supports provides the heighth adjustment for the top of the postal stand. U.S. Pat. No. 2,020,766 issued Nov. 12, 1935 to Reinhardt H. Brown shows a wheeled collapsible cart with a flexible bag inserted in the cart for holding items placed in the cart. The cart is collapsible and expandable in length only, however.

The prior art fails to disclose an improved, expandable and collapsible carrier or cart made of a minimum of individual parts yet is fully adjustable in three dimensions to a variety of sizes, may be manually or motor operated, can assume a quadrilateral shape other than rectangular or regular hexahedronal, and may have collapsible carrier wheels to minimize the configuration of the carrier for storage when not in use. None of the above inventions and patents, taken either singly or in combination, is seen to describe the instant invention as disclosed and claimed.

SUMMARY OF THE INVENTION

Accordingly, one object of the present invention is to provide an improved expandable and collapsible carrier which may be adjusted in size in all three dimensions yet be made of a minimum number of groups of identical parts.

It is another object of the present invention to provide an improved expandable and collapsible carrier which may be manually or motor operated.

It is a further object of the invention to provide an improved expandable and collapsible carrier which may be adjusted to a size in all three dimensions simply by moving selected components of the carrier in one dimension only.

Yet other objects of the present invention are to provide an improved expandable and collapsible carrier having an insertable or inserted flexible carrying bag, an optional strap for pulling the carrier along when desired, lightweight material construction for the ease and convenience of the user, and sturdy construction for prolonged service life.

These and other objects of the present invention will become readily apparent upon further review of the following specification and drawings.

BRIEF DESCRIPTION OF THE DRAWINGS

FIG. 3A is a top plan, somewhat diagrammatic view of the carrier in a fully expanded configuration;

FIG. 3B is a view similar to FIG. 3A but showing the carrier in a fully compressed condition, ready for storage;

FIG. 4 is a detail perspective view of both one base corner of the scissors linkage assembly for the carrier and one pair of the side legs of the carrier base;

FIG. 5 is a detail elevation view of a front wheel of the carrier;

FIG. 6 is a detail elevation view of a rear wheel of the carrier;

FIG. 7 is a top plan, somewhat diagrammatic view of a carrier having a non-rectangular configuration (e.g., triangular) when viewed in plan;

FIG. 8 is a partial, detail perspective view showing the relationship of one set of adjacent legs of corner segments making up the lower and upper structural members of the carrier;

FIG. 9 is a section view taken along lines 9—9 of FIG. 8, drawn to an enlarged scale, and showing one structure for securing together adjacent legs of corner segments of the carrier;

FIG. 10 is a section view similar to FIG. 9 but illustrating another structure for securing together adjacent legs of corner segments of the carrier;

FIG. 11 is a detail, elevation view taken along lines 11—11 of FIG. 10;

FIG. 12 is a detail cross-section view taken along lines 12—12 of FIG. 8;

FIG. 13 is a detail plan view showing a control panel for operating a motorized embodiment of the carrier;

FIG. 14 is a partial, detail section view illustrating a motor and rack-and-pinion drive for expanding and compressing the carrier;

FIG. 15 is a detail plan view showing an arrangement for a folding wheel for the carrier; all four wheels of the carrier may be similarly constructed; and FIG. 16 is a partial section, elevation view taken along lines 16—16 of FIG. 15.

Similar reference characters denote corresponding features consistently throughout the attached drawings.

DETAILED DESCRIPTION OF THE PREFERRED EMBODIMENTS

Figure 1:
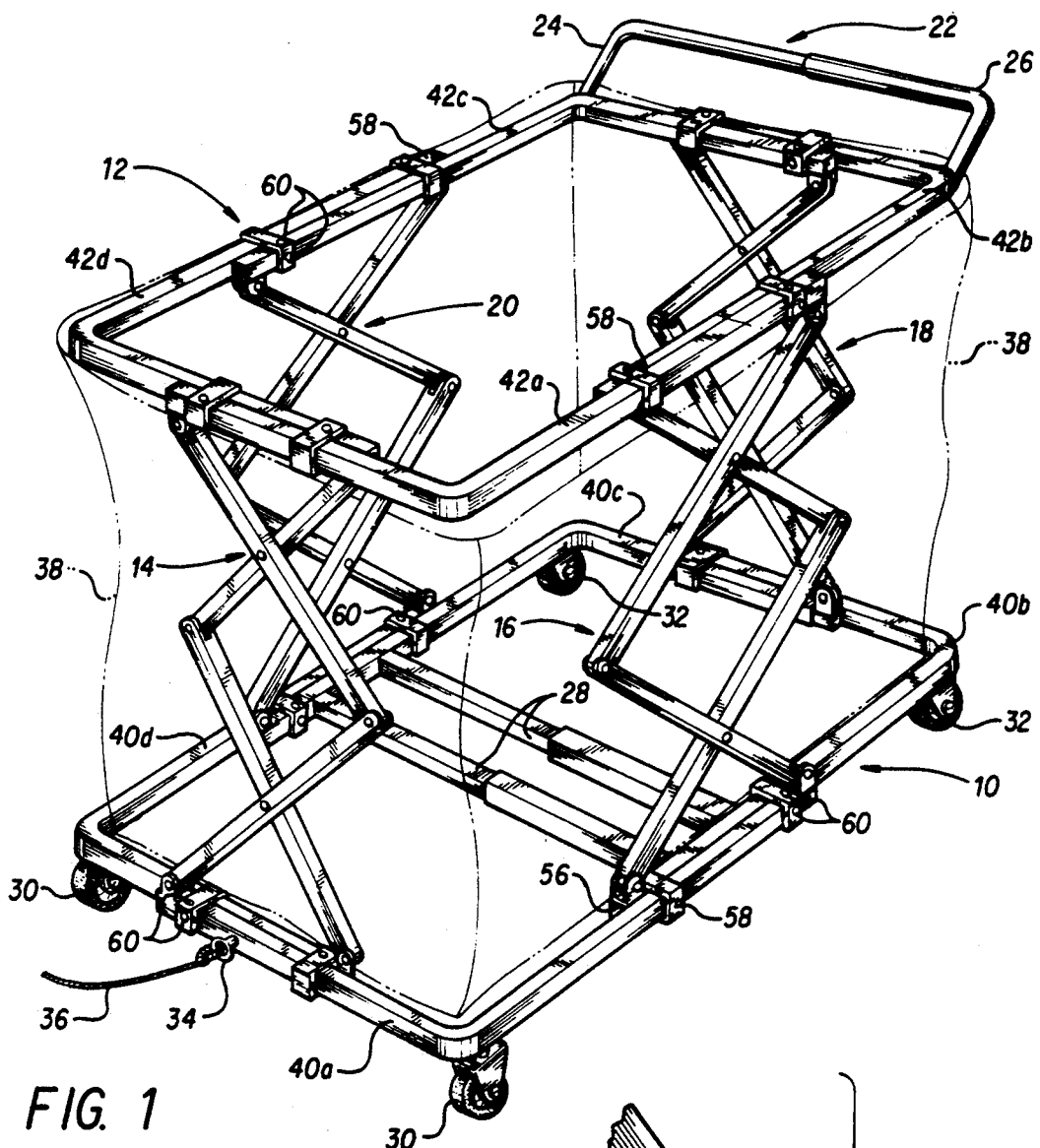
FIG. 1 is a perspective view of a preferred embodiment of the invention.

With reference to FIG. 1, an improved expandable and compressible carrier in a fully expanded disposition, the carrier being made up of a lower base structural member 10, an upper structural member 12, and four vertical extension assemblies 14, 16, 18 and 20, each in the form of a scissors linkage operative in lazy tong fashion. A handle 22 includes a pair of telescopically interfitting sections 24, 26. If desired, and for further structural integrity, base member 10 may include one or more telescopically interfitted cross braces 28. Base member 10 is further equipped with front wheels or casters 30, 30 and rear wheels 32, 32. With reference to FIGS. 5 and 6, it is seen that the front wheels 30 and rear wheels 32 are of "grocery cart" configuration, with front wheels mounted to freely rotate about a vertical axis and rear wheels 32 confined to roll about a common horizontal axis only. Also, the forward end of base member 10 may have an eyebolt 34 and towing strap 36 for pulling the carrier along. Of course, the strap 36 and eyebolt 34 could be affixed to the forward end of upper member 12, as an alternative. A carrying container or bag 38 (illustrated in phantom lines in FIG. 1) may be inserted into the carrier. Preferably, bag 38 is made of flexible but fairly sturdy material and can be of solid or mesh material fabrication.

Figure 2:
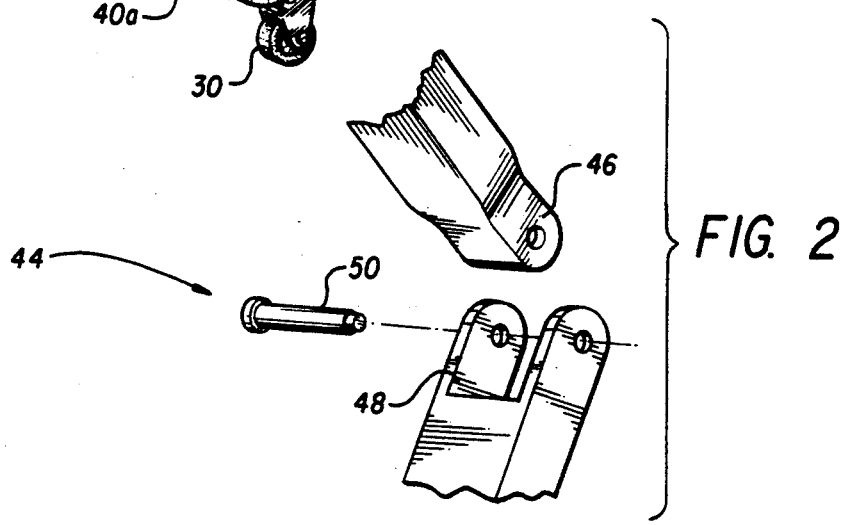
FIG. 2 is an exploded, detail view in perspective illustrating one knuckle joint in the scissors linkage arrangement which provides vertical adjustment of the carrier.

With further reference to FIG. 1, it is readily appreciated that base member 10 is defined by four identically configured, two legged corner segments 40a, 40b, 40c and 40d. Similarly, the upper structural member 12 is defined by a second set of four identically configured, two legged segments 42a, 42b, 42c and 42d. Conveniently, all of the corner segments 40, 42 may be of identical construction which imparts obvious economy in fabrication of the carrier. For even further economy, all of the vertical scissors linkages 14 may be of identical construction. With reference to FIG. 2, an intermediate, and otherwise conventional, knuckle joint 44 of a scissors linkage 14 includes a male end 46 received in a female end 48, the ends 46, 48 being pivotally secured together by a pin 50.

As is seen in FIG. 1, the legs of adjacent corner segments 40 and 42 are arranged in sliding relationship, externally of one another. This is further illustrated in FIG. 4, with reference to the adjacent legs of corner segments 40a and 40b, by way of example. Each leg of a corner segment, e.g., 40b, has a distal end E with a pair of extending ears 52, 52 within which is pivotally secured an end piece of a scissors linkage 14, as by a pin 54. For cosmetic purposes, the open end E may be closed by a decorative cap 56. The legs of corner segments 40a, 40b are slidably retained together by pairs of straps or sleeve segments 58 around adjacent legs, each strap being affixed as by rivets 60 to each end E, next to the ears 54, 54 for scissors linkage 14. Referring again to FIG. 1, it is seen that the construction details just set forth are a pattern which is repeated all the way around both the lower base structure 10 and the upper structure 12.

FIGS. 3A and 3B illustrate the carrier in a fully expanded configuration and a completely compressed condition, respectively. As the carrier is compressed, the lateral, telescoping cross pieces, that is, the handle 22 and base members 28, 28, will be reduced in length. Also, the corner segments 40 and 42 will be drawn together into the greatly reduced size rectangular shape seen in FIG. 3B. Referring back to FIG. 1, it will be appreciated that, due to the multiple scissors linkages 14 interconnecting the corner segments 40 and 42, a pulling apart motion in any one dimension of the carrier causes the carrier to expand in the other two dimensions. Conversely, a drawing together of the carrier components in any dimension causes the carrier to compress in the other two dimensions. This feature provided by the detailed structure of the carrier as set forth above, provides an expandable and compressible carrier of optimum simplicity in moving the carrier to an expanded state for use and back again to a compressed condition for storage.

Turning now to FIG. 7, a non-rectangular configured embodiment of the carrier is illustrated. Specifically, a generally triangular carrier is shown with upper and lower corner segments 42a—40a, 42b—40b and 42c—42d making up the upper member 12 and lower member 10, respectively. Since the carrier shape is non-rectangular, the corners of each upper and lower corner segment have their legs pivotally connected together as indicated at 62 in FIG. 7. This allows for expansion and compression of the carrier without binding of the individual elements.

FIGS. 8-12, inclusive, illustrate various embodiments of structural details regarding the external sliding relationship of the legs of corner segments, segments 40a and 40b being shown by way of example for all the corner segments, as well as various components for securing the carrier in an expanded, compressed or partially expanded attitude. With reference to FIGS. 8 and 9, a simple thumb wheel 64 threaded at 66 through a leg of corner segment 40a and tightened against a face of a leg of corner segment 40b may be provided to lock carrier components together. Because of the interlocking relationship of carrier components set forth above, the provision of as few as two such thumb wheels 64 at, for example, opposite ends of upper structural member 12, would only be needed to secure the carrier in a stable attitude, whether expanded or compressed. Again, economy in fabrication costs as well as operational advantages are readily appreciated.

An alternative to wheel 64 is shown in FIGS. 10-11, this being a latch pin 68 normally spring urged by coil spring 70 to a latched position and being selectively inserted into one of a series of latch pin holes 72. A keeper 74 is provided, if desired, to retain pin 68 in the withdrawn position shown in FIG. 10.

It may be preferred to provide a tracking between adjacent legs of corner members 40 and 42 and an example is illustrated in FIG. 12. An elongated recess 76 mating with an elongated ridge 78 are provided in the surfaces facing one another of the legs of the corner segments. This tracking structure helps to retain the corner segments in an aligned attitude as the carrier is expanded and compressed.

As a further advantage, the carrier may be motorized for even further ease of operation. In FIG. 14, a small electric motor 80, such as a low voltage stepper motor, is mounted interiorally of the leg of an upper corner segment 42b, and its shaft 82 extends through an adjacent leg of a corner segment 42a. A pinion 84 on shaft 82 is intermeshed with a rack 86 within the adjacent leg of corner segment 42a. Again, due to the inter-linked construction of the carrier, as few as two such motors and rack-and-pinion assemblies may be required, mounted oppositely either in upper structural member 12 or lower structural member 10. Furthermore, the entire carrier could be motor driven by the provision of small electric motors driving the rear wheels 32, 32 of the carrier. A simple control panel 88 is shown in FIG. 13 with self explanatory fingerpad elements 90; the panel 88 could be mounted on a leg of corner segment 42b, adjacent handle 22, for convenient access.

FIGS. 15 and 16 illustrate a folding wheel construction for the carrier which further minimizes the size of the carrier when compressed for storage. Clearly, all four wheels could be constructed as follows. A wheel 30, for example, is mounted to a flap 92 of a hinge 94, the other flap 96 of hinge 94 being mounted on the bottom of a corner segment 40d. A spring loaded extension wing 98 is normally urged to a position over flap 92, thus to lock wheel 30 in an operative position. When it is desired to collapse and store the carrier, it is only necessary to rotate wing away from flap 92 (or in a downward direction in the sense of FIG. 15) and fold wheel 30 upwardly, in the sense of FIG. 16. A catch, hook or strap (not shown) may be provided to secure the wheel 30 in the folded, storage configuration.

It is to be understood that the present invention is not limited to the embodiment described above, but encompasses any and all embodiments within the scope of the following claims.

I claim:

1. An improved expandable and collapsible carrier which is extended and contracted in all three dimensions, comprising:
   a. a first, lower set of a plurality of first corner segments, each first corner segment having two legs extended therefrom;
   b. a second, upper set of a plurality of second corner segments, each second corner segment having two legs extended therefrom;
   c. first means for slidably engaging adjacent legs of said first corner segments together, externally of one another, thus to form a lower, generally horizontal planarly disposed, base structural member which is expandable and compressible in a two dimensional plane;
   d. second means for slidably engaging adjacent legs of said second corner segments together, externally of one another, thus to form an upper, generally horizontal planarly disposed, structural member which is expandable and compressible in a two dimensional plane; and
   e. vertically extensible means interconnecting said base structural member and said upper structural member together for adjustably spacing apart said structural members, said vertically extensible means comprising a plurality of scissors elements operable in lazy tong fashion, each of said scissors elements having a pair of first, lower end pivot points and a pair of second, upper end pivot points, said each pair of lower pivot points being connected to lower corner segment legs adjacent one another, said each pair of upper end pivot points being connected to upper corner segment legs adjacent one another;
   whereby a carrier assembly is formed which may be simultaneously adjusted in horizontal area and heighth by mere expansion or contraction of one of said set of lower corner segments, said set of upper corner segments, and said vertically extensible means.

2. The invention as claimed in claim 1 wherein each of said lower corner segments further comprise wheel assemblies for rolling support of said carrier.

3. The invention as claimed in claim 2 wherein each of said wheel assemblies further comprise means for folding said wheel assemblies inwardly of said carrier, generally within a plane defined by said lower base member.

4. The invention as claimed in claim 1 wherein all of said lower corner segments are identical with one another.

5. The invention as claimed in claim 1 wherein all of said upper corner segments are identical with one another.

6. The invention as claimed in claim 1 wherein all of said lower and upper corner segments are identical with one another.

7. The invention as claimed in claim 1, wherein said lower base structural member further comprises horizontally extensible means in the form of cross brace means attached to and interconnecting at least two of said first corner segments together, thereby to impart further structural integrity to said lower base structural member.

8. The invention as claimed in claim 1 wherein each of said corner segments is fabricated of open tubular stock material having a rectangular configuration in cross section.

9. The invention as claimed in claim 1 further comprising a flexible bag suspended within the region defined by said structural members and said vertically extensible means.

10. The invention as claimed in claim 1 wherein said lower base structural member comprises an odd number of said first corner segments and said upper structural member comprises an equivalent odd number of said second corner segments, the two legs of each of said first and second corner segments being pivotally attached to one another, whereby said lower and upper structural members are of a non-rectangular configuration.

11. The invention as claimed in claim 1 wherein at least one of said first and second means for slidably engaging legs of corner segments together comprise motor means for slidably moving at least two adjacent legs in opposed, linear directions.

12. The invention as claimed in claim 1 wherein there are four of said first corner segments, four of said second corner segments, and four of said vertically extensible means, there further being distal ends on each of said legs, said leg distal ends being pivotally connected to said scissors elements pivot points. such that, upon expansion of said carrier from a compressed disposition in any one of three dimensions, said carrier will expand in the other two of three dimensions.

13. The invention as claimed in claim 12 wherein at least one of said first and second means for slidably engaging legs of corner segments together further comprise motor means for slidably moving at least two adjacent legs in opposed, linear directions.

14. The invention as claimed in claim 12 wherein at least two of said first and second means for slidably engaging legs of corner segments together further comprise a pair of motor means for slidably moving at least a pair of two adjacent legs in opposed, linear directions.

15. An improved expandable and collapsible carrier which is extended and contracted in all three dimensions, comprising:

a. a first, lower set of a plurality of first corner segments, each first corner segment having two legs extended therefrom;
b. a second, upper set of a plurality of second corner segments, each second corner segment having two legs extended therefrom;
c. first means for slidably engaging adjacent legs of said first corner segments together, thus to form a lower base structural member which is expandable and compressible in a two dimensional plane;
d. second means for slidably engaging adjacent legs of said second corner segments together, thus to form an upper structural member which is expandable and compressible in a two dimensional plane; and
e. vertically extensible means interconnecting said base structural member and said upper structural member together for adjustably spacing apart said structural members, said vertically extensible means comprising a plurality of scissors elements operable in lazy tong fashion, each of said scissors elements having a pair of first, lower end pivot points and a pair of second, upper end pivot points, said each pair of lower pivot points being connected to lower corner segment legs adjacent one another, said each pair of upper end pivot points being connected to upper corner segment legs adjacent one another;

whereby a carrier assembly is formed which may be simultaneously adjusted in horizontal area and heighth by mere expansion or contraction of one of said set of lower corner segments, said set of upper corner segments, and said vertically extensible means.

16. The invention as claimed in claim 15 wherein at least one of said first and second means for slidably engaging legs of corner segments together comprise motor means for slidably moving at least two adjacent legs in opposed, linear directions.

17. The invention as claimed in claim 15, wherein said lower base structural member further comprises horizontally extensible means in the form of cross brace means attached to and interconnecting at least two of said first corner segments together, thereby to impart further structural integrity to said lower base structural member.

18. The invention as claimed in claim 15 wherein each of said lower corner segments further comprise wheel assemblies for rolling support of said carrier.

19. The invention as claimed in claim 18 wherein each of said wheel assemblies further comprise means for folding said wheel assemblies inwardly of said carrier, generally within a plane defined by said lower base member.

20. The invention as claimed in claim 15 further comprising a flexible bag suspended within the region defined by said structural members and said vertically extensible means.

21. The invention as claimed in claim 15 wherein there are four of said first corner segments, four of said second corner segments, and four of said vertically extensible means, there further being distal ends on each of said legs, said leg distal ends being pivotally connected to said scissors elements pivot points such that, upon expansion of said carrier from a compressed disposition in any one of three dimensions, said carrier will expand in the other two of three dimensions.

22. The invention as claimed in claim 21 wherein at least one of said first and second means for slidably engaging legs of corner segments together further comprise motor means for slidably moving at least two adjacent legs in opposed, linear directions.

23. The invention as claimed in claim 21 wherein at least two of said first and second means for slidably engaging legs of corner segments together further comprise a pair of motor means for slidably moving at least a pair of two adjacent legs in opposed, linear directions.

* * * * *